United States Patent
Vellore Ramesh et al.

(10) Patent No.: US 10,515,055 B2
(45) Date of Patent: Dec. 24, 2019

(54) MAPPING LOGICAL IDENTIFIERS USING MULTIPLE IDENTIFIER SPACES

(71) Applicant: NetApp, Inc., Sunnyvale, CA (US)

(72) Inventors: Bharadwaj Vellore Ramesh, San Jose, CA (US); Venkata Vijay Chaitanya Challapalli, San Jose, CA (US); Dnyaneshwar Pawar, Bangalore (IN); Alok Sharma, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 524 days.

(21) Appl. No.: 14/859,009

(22) Filed: Sep. 18, 2015

(65) Prior Publication Data
US 2017/0083537 A1    Mar. 23, 2017

(51) Int. Cl.
*G06F 16/00* (2019.01)
*G06F 16/174* (2019.01)
*G06F 16/13* (2019.01)
*G06F 3/06* (2006.01)

(52) U.S. Cl.
CPC ........ *G06F 16/1748* (2019.01); *G06F 3/0601* (2013.01); *G06F 16/137* (2019.01)

(58) Field of Classification Search
CPC ......... G06F 17/30156; G06F 17/30097; G06F 16/1748; G06F 16/137; G06F 3/0601
USPC ....................................................... 707/692
See application file for complete search history.

(56) References Cited

U.S. PATENT DOCUMENTS

| | | | |
|---|---|---|---|
| 8,799,601 B1 * | 8/2014 | Chen | G06F 3/0608 711/161 |
| 8,918,372 B1 * | 12/2014 | Guo | G06F 16/1748 707/692 |
| 9,268,784 B1 * | 2/2016 | Guo | G06F 3/0641 |
| 2009/0234892 A1 * | 9/2009 | Anglin | G06F 16/1756 |
| 2010/0250896 A1 * | 9/2010 | Matze | G06F 3/0608 711/216 |
| 2011/0016152 A1 * | 1/2011 | Popovski | G06F 3/0608 707/797 |
| 2011/0022825 A1 * | 1/2011 | Spackman | G06F 3/0608 712/240 |
| 2011/0055471 A1 * | 3/2011 | Thatcher | G06F 3/0608 711/114 |
| 2011/0125720 A1 * | 5/2011 | Jayaraman | G06F 16/1748 707/692 |
| 2012/0150814 A1 * | 6/2012 | Vijayan Retnamma | G06F 11/1453 707/674 |
| 2012/0158670 A1 * | 6/2012 | Sharma | G06F 3/0608 707/692 |
| 2013/0046949 A1 * | 2/2013 | Colgrove | G06F 3/0608 711/170 |

(Continued)

*Primary Examiner* — Thanh-Ha Dang
(74) *Attorney, Agent, or Firm* — Pepper Hamilton LLP

(57) ABSTRACT

It is determined that a first data unit is to be written to a storage device and that the first data unit is associated with a first attribute. In response to determining that the first data unit is associated with the first attribute, a first identifier is selected from a first identifier space and the first identifier is associated with the first data unit. It is determined that a second data unit is to be written to the storage device and that the second data unit is associated with the second attribute. In response to determining that the second data unit is associated with the second attribute, a second identifier is selected from a second identifier space and the second identifier is associated with the second data unit.

9 Claims, 8 Drawing Sheets

(56) References Cited

U.S. PATENT DOCUMENTS

| | | | |
|---|---|---|---|
| 2013/0067237 A1* | 3/2013 | Huang | G06F 16/113 |
| | | | 713/189 |
| 2013/0073821 A1* | 3/2013 | Flynn | G06F 3/061 |
| | | | 711/162 |
| 2013/0097380 A1* | 4/2013 | Colgrove | G06F 3/0608 |
| | | | 711/118 |
| 2013/0151484 A1* | 6/2013 | Kruglick | G06F 16/23 |
| | | | 707/692 |
| 2015/0058583 A1* | 2/2015 | Baldwin | G06F 3/0641 |
| | | | 711/162 |
| 2015/0106345 A1* | 4/2015 | Trimble | G06F 16/1748 |
| | | | 707/692 |
| 2015/0161000 A1* | 6/2015 | Kim | G06F 11/108 |
| | | | 714/6.24 |
| 2015/0261792 A1* | 9/2015 | Attarde | G06F 16/215 |
| | | | 707/616 |
| 2015/0293817 A1* | 10/2015 | Subramanian | G06F 16/184 |
| | | | 707/645 |
| 2016/0070495 A1* | 3/2016 | Periyagaram | G06F 11/2056 |
| | | | 711/159 |
| 2016/0070652 A1* | 3/2016 | Sundararaman | G06F 3/0619 |
| | | | 711/154 |
| 2016/0092137 A1* | 3/2016 | Doerk | G06F 3/0641 |
| | | | 711/159 |
| 2016/0092138 A1* | 3/2016 | Knestele | G06F 3/0619 |
| | | | 711/103 |
| 2016/0139849 A1* | 5/2016 | Chaw | G06F 3/0641 |
| | | | 711/119 |
| 2016/0154839 A1* | 6/2016 | Bezawada | G06F 16/2365 |
| | | | 707/692 |
| 2017/0031946 A1* | 2/2017 | Sarab | G06F 16/1748 |

* cited by examiner

MAPPING LOGICAL IDENTIFIERS USING MULTIPLE IDENTIFIER SPACES

BACKGROUND

The disclosure generally relates to the field of computing systems, and more particularly to mapping identifiers in storage systems.

A file system is a mechanism of organizing data on a computing system and/or associated storage systems/devices. The file system implements one or more techniques for identifying specific portions of data. For example, a file-level file system may identify a particular group of data using a filename (possibly including a file path) or a block-level file system may assign block numbers to individual blocks of data.

Software and hardware that implement a file system may include functionality that facilitates interaction with various aspects of the file system. For example, an operating system might implement one or more functions that allow applications to access data stored as part of the file system. Similarly, a computing system might include a hardware bus and/or networking hardware that allows for data to be transferred between various computing system components, thus allowing data stored on storage devices to be accessed. As used herein, the term "file system" refers to the organizational structure of the file system, file system metadata, data stored within the file system, functionality that facilitates the operation and/or use of the file system, etc.

Overview

Storage systems (and other computing system components) may map one set of identifiers to a second set of identifiers (e.g., logical identifiers to logical identifiers, logical identifiers to physical identifiers, etc.). Generally, each set of identifiers is part of a single identifier space. For example, the logical identifiers used by a storage system are sourced from a single set of values. However, a storage system can implement multiple identifier spaces that each represents one or more particular attributes of data associated with the particular identifier. For example, a storage system might determine that first received data is available for inline deduplication and assign an identifier from a first identifier space to the first received data. The storage system might determine that second received data is not available for inline deduplication and assign an identifier from a second identifier space to the second received data.

This overview is a brief overview for the disclosure, and not a comprehensive overview. The purpose of this brief overview is to provide a compact explanation as a preview to the disclosure. This brief overview does not capture the entire disclosure or all aspects, and should not be used limit claim scope.

BRIEF DESCRIPTION OF THE DRAWINGS

Aspects of the disclosure may be better understood by referencing the accompanying drawings.

DESCRIPTION

Figure 1:
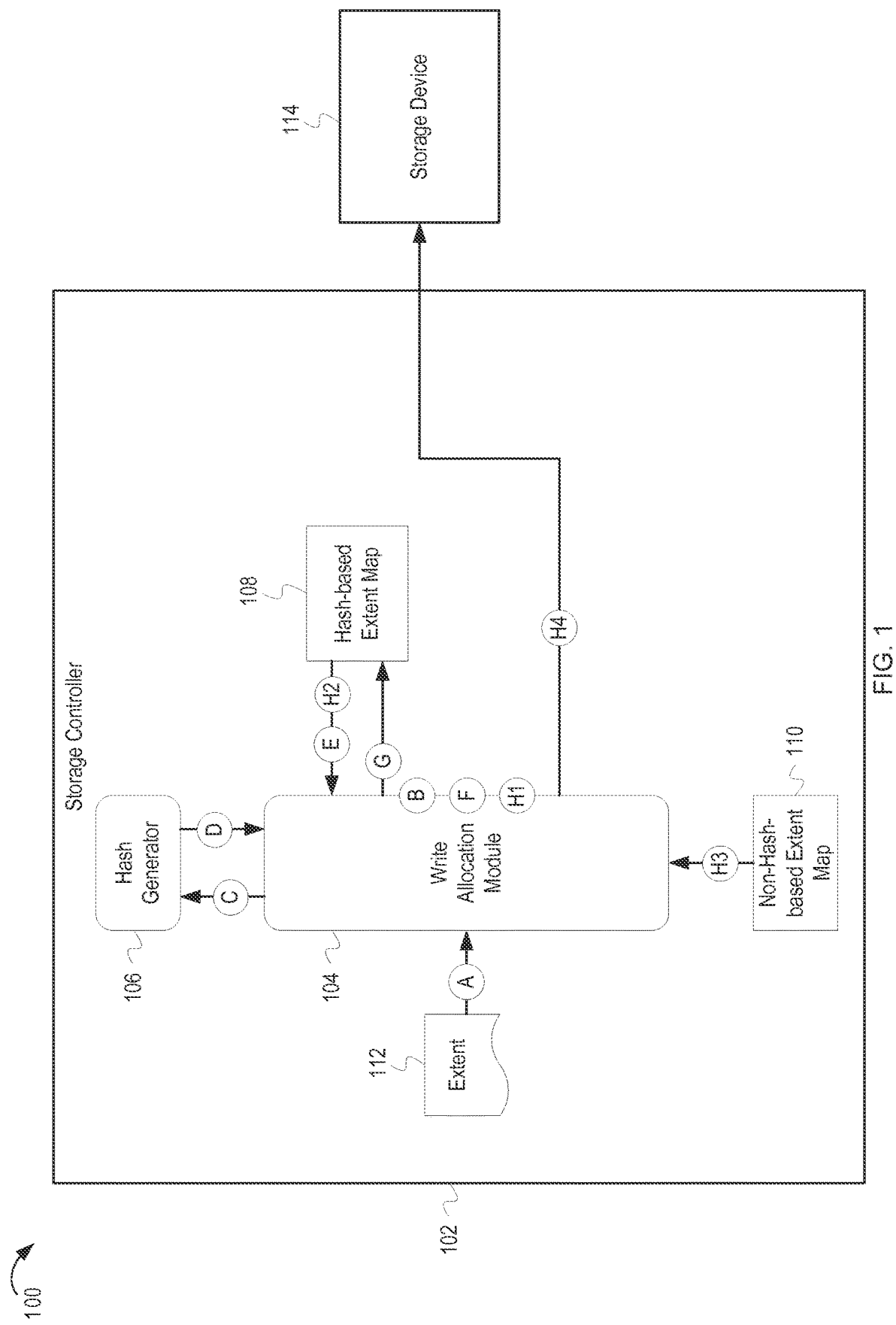
FIG. 1 depicts the allocation of a hash-based extent identifier by an example storage system with multiple identifier spaces when an extent is deduplicated.

The description that follows includes example systems, methods, techniques, and program flows that embody aspect of the disclosure. However, it is understood that this disclosure may be practiced without these specific details. For instance, this disclosure refers to extents in illustrative examples. But aspects of this disclosure can be applied to blocks, files, and other data units (whether file system related or not). In other instances, well-known instruction instances, protocols, structures and techniques have not been shown in detail in order not to obfuscate the description.

File systems operate on units of data, such as blocks, extents, and files. These data units can be formed from other data units. For example, an extent can comprise multiple blocks. The data units can be identified (or "addressed") with one or more identifiers. For example, a block may be identified by a block identifier (logical or physical), an extent may be identified by an extent identifier, etc. A particular identifier can be used in conjunction with the file system and/or storage system hardware to locate the data identified by the particular identifier. This typically occurs by mapping identifiers to a physical identifier that identifies a particular location on a storage device at which the data is stored.

The identifiers used are generally sourced from a particular set of available identifiers (hereinafter "identifier space"). For example, a file system might choose a logical block identifier from a set of integers. Typically, the identifier is selected from a single identifier space. However, a file system can be designed to use multiple identifier spaces. Each identifier space can be associated with a particular attribute of the underlying data. Use of multiple identifier spaces can reduce metadata overhead and increase efficiency of the file system.

For example, consider the use of multiple identifier spaces to support deduplication. A file system can analyze data units to determine if any of the data units are identical. If the file system determines that two or more data units are identical, the file system can remove ("deduplicate") all but one of the data units by mapping the other data units to the one remaining data unit and freeing the other data units. For example, assume that a file system maps logical blocks to physical blocks. If two physical blocks are identical, the file system can map both of the corresponding logical blocks to a first of the physical blocks and identify the second of the physical blocks as being free. Thus, when a request for either of the logical blocks is received, the file system can satisfy the request by retrieving the data from a single physical block.

To quickly identify potential candidate data units for deduplication, a file system typically creates a hash of the data unit. The file system can then compare the hash to other stored hashes. If the file system identifies two identical hashes, the data unit is a candidate for deduplication. Once a data unit is identified as a candidate for deduplication, the file system compares the data units (typically bitwise) that have the same hash. This allows the file system to verify whether the data units are actually identical or whether a hash collision has occurred. If the file system determines that two data units are, in fact, identical, the file system deduplicates the data units.

If the file system determines that the generated hash does not match any existing hashes, the file system stores the generated hash, allowing the file system to deduplicate any subsequent data that is identical to the data unit. Thus, the file system typically stores the hash as well as any logical identifier. By using multiple identifier spaces, however, the file system can reduce the amount of metadata stored by storing only the hash instead of both the hash and a logical identifier. In particular, if the file system determines that the data unit is a duplicate or that subsequent data units may be duplicates, the file system uses the hash as the data unit identifier. If the file system determines that the data unit cannot be deduplicated, the file system uses a non-hash-based logical identifier as the data unit identifier. The file system can maintain separate mapping structures for hash-based identifiers and the non-hash-based identifiers. The mapping structure for the hash-based identifier also serves as the database of hashes (also known as a "fingerprint database").

When using a single identifier space, the file system calculates a hash and allocates a logical identifier to a data unit. When using multiple identifier spaces, however, the file system uses the generated hash as a logical identifier for some data units. Thus, the file system efficiency is increased because the operations associated with allocating a separate, non-hash-based logical identifier (e.g., identifying an available logical identifier and updating file system metadata to reflect the allocation) are not performed. Thus, instead of mapping a hash to a logical identifier and mapping the logical identifier to metadata, a hash is mapped to the metadata.

Figure 2:
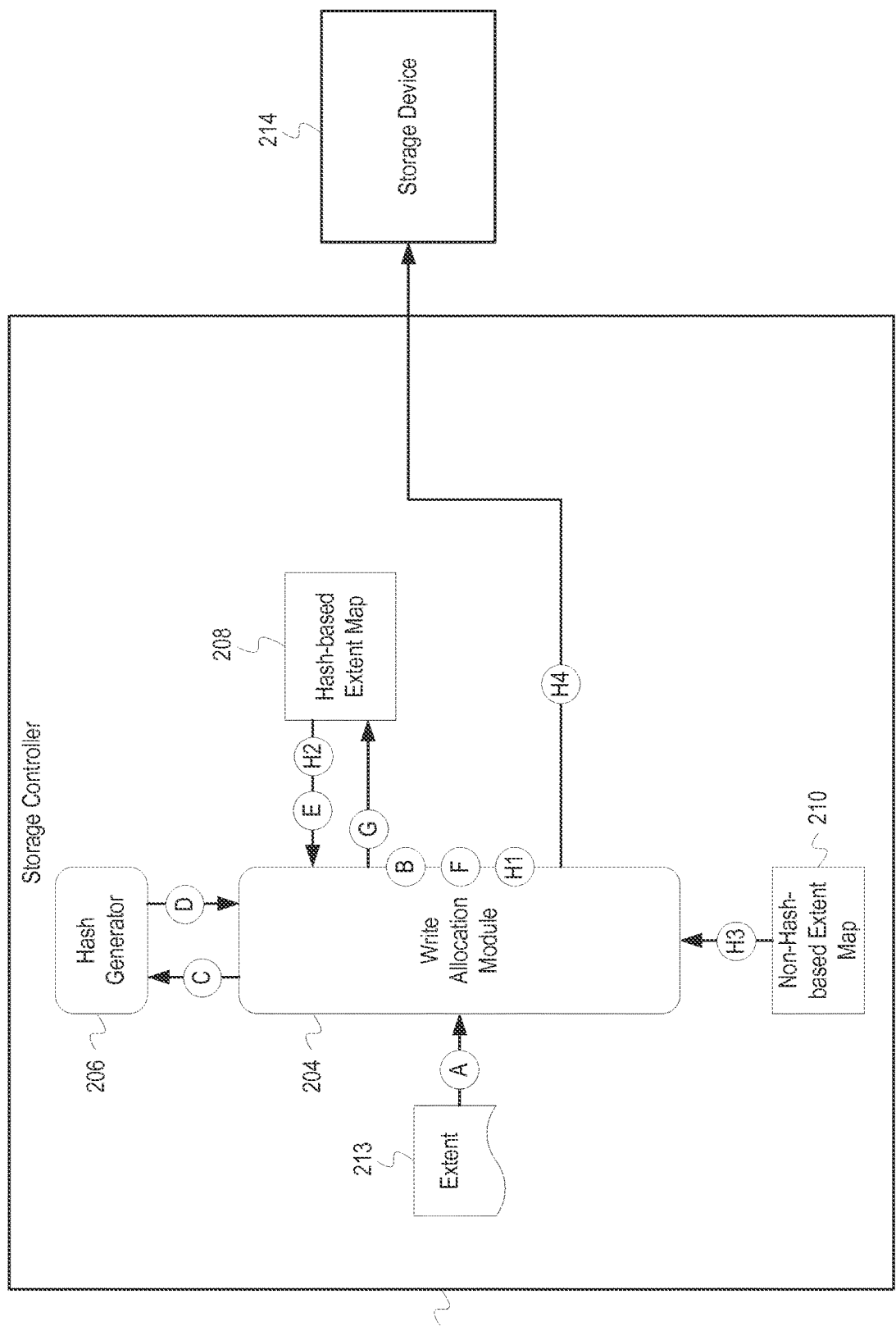
FIG. 2 depicts the allocation of a hash-based extent identifier by an example storage system with multiple identifier spaces when an extent is not deduplicated.
Figure 3:
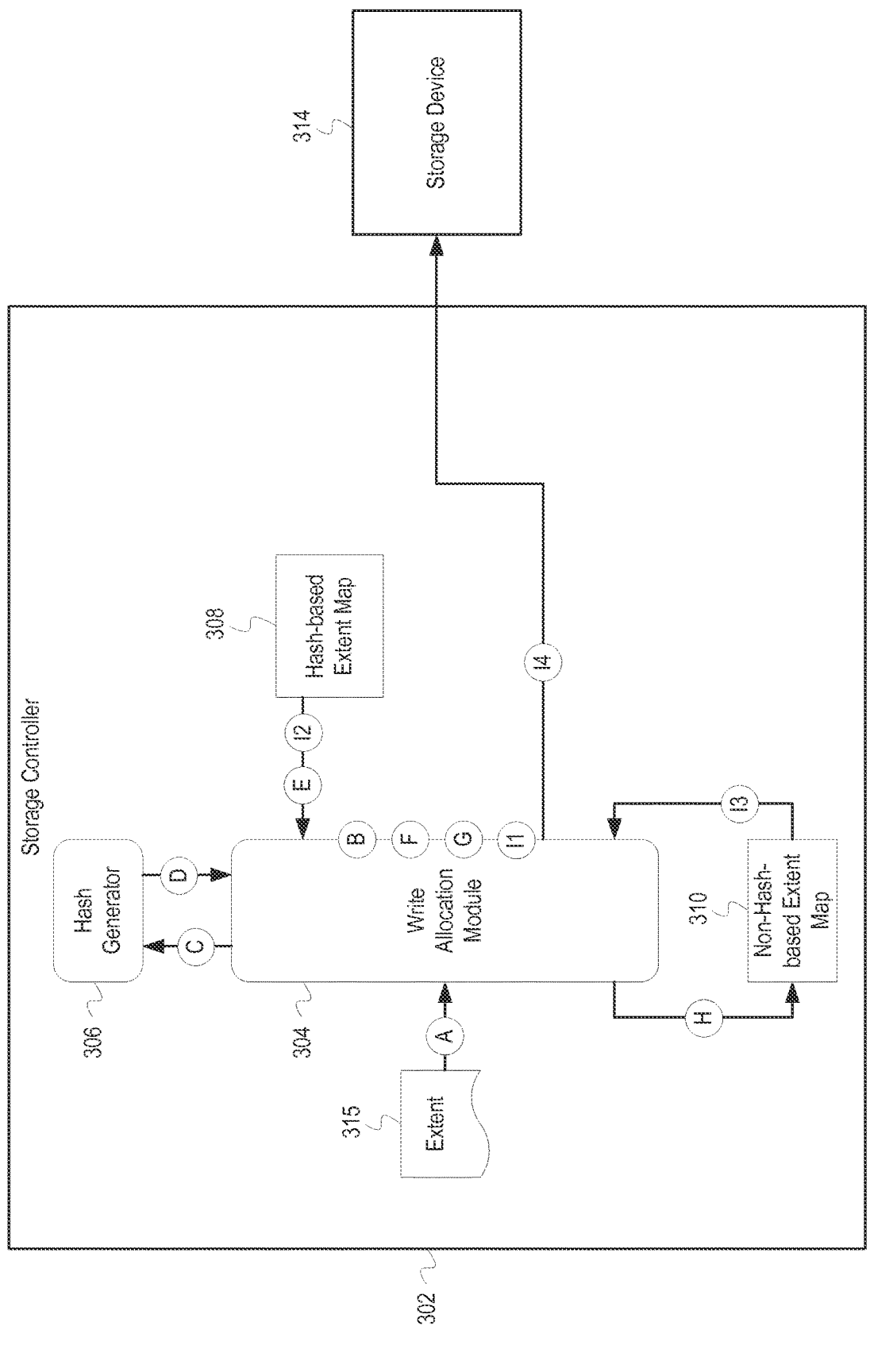
FIG. 3 depicts the allocation of a non-hash-based extent identifier by an example storage system with multiple identifier spaces.

FIGS. 1 through 3 depict the operations performed by example storage systems when receiving a data unit (an extent) to write to a storage device. In particular, FIGS. 1 and 2 depict scenarios in which an extent identifier is allocated to an extent based on a hash of the extent. FIG. 3, in contrast, depicts a scenario in which an extent identifier is allocated from a non-hash-based identifier space. Although the examples below describe the use of multiple identifier spaces in conjunction with deduplication, the operations described can be adapted for use of multiple identifier spaces in other scenarios, such as storage systems utilizing compression or encryption.

FIG. 1 depicts the allocation of a hash-based extent identifier by an example storage system with multiple identifier spaces when an extent is deduplicated. FIG. 1 depicts a storage system 100 including a storage controller 102 and a storage device 114. The storage controller 102 includes a write allocation module 104 and a hash generator 106. The storage controller 102 also includes hash-based extent map 108 and non-hash-based extent map 110. The hash-based extent map 108 and the non-hash-based extent map 110 comprise file system metadata and may reside in memory on the storage controller 102. Additionally, a copy of the hash-based extent map 108 and the non-hash-based extent map 110 is stored on the storage device 114. The storage device 114 can comprise one or more individual storage devices. For example, the storage device 114 can be a single hard drive, an array of drives, or a complex assortment of storage devices managed by a storage controller independent of the storage controller 102.

At stage A, the write allocation module 104 receives an extent 112 to be written to the storage device 114. The extent 112 can be received from an external source, such as a client (not depicted) or another component within the storage controller 102. The extent 112 comprises a set of logically contiguous blocks of data. The extent 112 may be associated with additional metadata. For example, the extent 112 may be associated with a file identifier, a file offset, a volume identifier, etc.

At stage B, the write allocation module 104 determines whether the extent 112 can be deduplicated. Whether a particular extent can be deduplicated may be based on various criteria. For example, data stored on the storage device 114 might be divided into "regions". Regions may be formed on a per-logical volume basis, based on the type of media the data is stored on (e.g., solid state drives or hard drives), whether the data is user data or file system metadata, etc. Some regions might overlap (e.g., some portions of a logical volume might be stored on solid state drives). Each region can be associated with various configuration options, including whether deduplication for that region is enabled.

To determine whether the extent 112 can be deduplicated, the write allocation module 104 identifies a region associated with the extent 112. The write allocation module 104 then determines whether the region has deduplication enabled by accessing metadata associated with the region. If each of the associated region has deduplication enabled, the write allocation module 104 determines that the extent 112 can be deduplicated. In this particular example, the region that the extent 112 is associated with has deduplication enabled. Thus, the write allocation module 104 determines that the extent 112 can be deduplicated.

At stage C, the write allocation module 104 sends the extent 112 to the hash generator 106. Instead of sending the extent 112 itself, the write allocation module 104 can send a reference (e.g., a memory location) at which the extent 112 is stored. The write allocation module 104 can send the extent 112 via a function call, inter-process messaging, etc.

At stage D, the hash generator 106 generates a hash based, at least in part, on the extent 112 and sends the hash to the write allocation module 104. To generate the hash, the hash generator 106 performs one or more operations using the extent 112 as an input parameter to the one or more operations. For example, the hash generator 106 might perform operations to generate a hash based on a hash generation algorithm such as MD5 or SHA-1. The hash generated is typically smaller than the extent 112 itself. For example, if the extent 112 is 4 KB, the hash might be 64 bits or 128 bits. The hash generator 106 may generate the hash based on additional values as well. For example, a first set of bits of the hash may be based on a volume identifier while a second set of bits of the hash may be based on the extent 112. The hash generator 106 can send the hash to the write allocation module 104 via a function call, inter-process messaging, etc.

At stage E, the write allocation module 104 determines whether the hash is located in the hash-based extent map 108. The hash-based extent map 108 maps extent hashes to physical block numbers. A particular physical block number that corresponds to a particular hash identifies the location of the extent associated with the particular hash on the storage device 114. To determine whether the hash is located in the hash-based extent map 108, the write allocation module 104 can scan the hash-based extent map 108, perform a binary search, etc. In some instances, the write allocation module 104 might utilize an index of hashes associated with the hash-based extent map 108. In this particular example, the write allocation module 104 determines that the hash generated by the hash generator 106 at stage D is located in the hash-based extent map 108.

At stage F, the write allocation module 104 determines whether the extent 112 comprises data identical to that of an extent associated with the hash located in the hash-based extent map 108 identified at stage E ("existing extent"). The write allocation module 104 thus reads the existing extent from the storage device 114 (if not already located in cache or other memory on the storage controller 102). As described above, the hash-based extent map 108 maps extent hashes to physical block numbers. Thus, to read the existing extent from the storage device 114, the write allocation module 104 can send the physical block number mapped to the hash in the hash-based extent map 108 to the storage device 114. The hash is thus used in conjunction with the hash-based extent map 108 to identify the storage location of the existing extent.

Once the write allocation module reads the existing extent from the storage device 114, the write allocation module 104 performs a bitwise comparison between the extent 112 and the existing extent. If the comparison fails (e.g., the extent 112 is not identical to the existing extent), a hash collision has occurred. In this example, the extent 112 and existing extent are identical.

At stage G, the write allocation module 104 updates the hash-based extent map 108 to indicate that the extent 112 will be shared with the existing extent. In other words, because the extent 112 is identical to the existing extent, extent 112 can be deduplicated. The particular operations performed by the write allocation module 104 to deduplicate the extent 112 can vary depending on the deduplication mechanism implemented by the storage controller 102. In this particular example, the write allocation module 104 increments a reference count associated with the existing extent.

At stage H, the write allocation module 104 performs operations to "commit" the status of the file system. In this example, stage H comprises multiple sub-stages (stages H1 through H4), as described below. The operations associated with stage H can be performed each time an extent is to be written, or periodically (e.g., when a "consistency point" is reached).

At stage H1, the write allocation module 104 updates any additional file system metadata to reflect the writing of the extent 112. For example, the extent 112 might comprise data associated with a particular file. In such a case, the write allocation module 104 can identify a file and a location within the file based on a file identifier and file offset associated with the extent 112. The write allocation module 104 can traverse a tree structure that represents the file (e.g., a set of inodes and corresponding indirect blocks) based on the file identifier and the file offset to locate a particular extent reference. The write allocation module 104 can then replace the extent reference in the tree structure with the hash generated by the hash generator 106 at stage D. Thus, if a read request for the file is received at a later point, the storage controller 102 can identify the extent 112 as comprising part of the file.

At stage H2, the write allocation module 104 reads the hash-based extent map 108 and prepares the hash-based extent map 108 for writing to the storage device 114.

At stage H3, the write allocation module 104 reads the non-hash-based extent map 110 and prepares the non-hash-based extent map 110 for writing to the storage device 114. In some instances, the non-hash-based extent map 110 may not have changed since it was previously written to the storage device 114. If the non-hash-based extent map 110 has not changed, the write allocation module 104 may not perform any operations to prepare the non-hash-based extent map 110 for writing to the storage device 114.

At stage H4, the write allocation module 104 writes the file system metadata, including the hash-based extent map 108 and the non-hash-based extent map 110 (if appropriate), to the storage device 114. The particular file system metadata written to the storage device 114 can vary. However, the file system metadata generally includes any data that reflects the current state of the file system. The extent 112 itself is not written to the storage device 114 because the extent 112 was deduplicated. In other words, instead of writing the extent 112 itself, the extent 112 is identified by the hash generated at stage D. Because the existing extent was already written to the storage device 114 (or cache on the storage controller 102) and is identified by the same hash, any subsequent request to read the extent 112 will be satisfied using the existing extent.

The particular operations performed by the write allocation module 104 at stage H can vary. For example, the write allocation module 104 might not be responsible for writing the file system metadata to the storage device 114. Instead, the write allocation module 104 might update the file system metadata in accordance with the request to write the extent 112 and let another component or process actually write the file system metadata to the storage device 114.

The description above describes extent-level deduplication in which whole extents are deduplicated. In some instances, the storage controller 102 may implement sub-extent level deduplication in which portions of an extent are deduplicated. The operations described herein can be adapted accordingly.

In some instances, other operations may be performed at stage F to determine whether the extent 112 and the existing extent are identical. For example, the write allocation module 104 might determine whether the length of the extent 112 and the existing extent is the same. If the lengths differ, the extents are not identical.

FIG. 2 depicts the allocation of a hash-based extent identifier by an example storage system with multiple identifier spaces when an extent is not deduplicated. FIG. 2 depicts a storage system 200 including a storage controller 202 and a storage device 214. The storage controller 202 includes a write allocation module 204 and a hash generator 206. The storage controller 202 also includes hash-based map 208 and non-hash-based extent map 210. The hash-based extent map 208 and the non-hash-based extent map 210 comprise file system metadata and may reside in memory on the storage controller 202. Additionally, a copy of the hash-based extent map 208 and the non-hash-based extent map 210 is stored on the storage device 214. The storage device 214 can comprise one or more individual storage devices. For example, the storage device 214 can be a single hard drive, an array of drives, or a complex assortment of storage devices managed by a storage controller independent of the storage controller 202.

The operations performed by the write allocation module 204 and the hash generator 206 at stages A through E can be substantially similar to those described above at stages A through E of FIG. 1. Similar to above, the write allocation module 204 determines that the extent 213 can be deduplicated. Additionally, the hash generated by the hash generator 206 at stage D can be the same as the hash generated at stage D of FIG. 1 or can differ. In this example, however, the write allocation module 204 determines, at stage E, that the hash is not located in the hash-based extent map 208.

At stage F, the write allocation module 204 allocates one or more physical blocks to the extent 213. To allocate the physical blocks, the write allocation module 204 identifies a set of contiguous physical blocks that are available (or "free"). The specific number of contiguous physical blocks identified varies according to the size of the extent 213. Once the set of contiguous physical blocks is identified, the write allocation module 204 indicates that the identified physical blocks are allocated. The specific mechanism to indicate that the identified physical blocks are allocated can vary. For example, the write allocation module 204 may remove physical block numbers corresponding to the identified physical blocks from a list of available physical blocks, mark the identified physical blocks as allocated, etc.

At stage G, the write allocation module 204 updates the hash-based extent map 208 to map the hash generated at stage D to the allocated physical blocks. To update the hash-based extent map 208, the write allocation module 204 adds a new entry to the hash-based extent map 208 that maps the hash of the extent 213 to the physical block number associated with the first of the set of contiguous physical blocks identified at stage F. The new entry in the hash-based extent map 208 may include additional metadata, such as the number of blocks in the extent 213, reference count, etc. Additional operations may be performed by that write allocation module 204 as well. For example, the write allocation module 204 may sort the hash-based extent map 208, update an index associated with the hash-based extent map 208, etc.

At stage H, the write allocation module 204 performs operations to "commit" the status of the file system. As in the example of FIG. 1, stage H comprises multiple sub-stages (stages H1 through H4). The operations performed by the write allocation module 204 at stage H can be substantially similar to those described above at stage H of FIG. 1. However, at stage H4 of FIG. 1, the extent 112 is not written to the storage device 114 because the extent was deduplicated. At stage H4 of FIG. 2, however, the extent 213 is written to the storage device 214.

FIG. 3 depicts the allocation of a non-hash-based extent identifier by an example storage system with multiple identifier spaces. FIG. 3 depicts a storage system 300 including a storage controller 302 and a storage device 314. The storage controller 302 includes a write allocation module 304 and a hash generator 306. The storage controller 302 also includes hash-based extent map 308 and non-hash-based extent map 310. The hash-based extent map 308 and the non-hash-based extent map 310 comprise file system metadata and may reside in memory on the storage controller 302. Additionally, a copy of the hash-based extent map 308 and the non-hash-based extent map 310 is stored on the storage device 314. The storage device 314 can comprise one or more individual storage devices. For example, the storage device 314 can be a single hard drive, an array of drives, or a complex assortment of storage devices managed by a storage controller independent of the storage controller 302.

The operations performed by the write allocation module 304 and the hash generator 306 at stages A through E can be substantially similar to those described above at stages A through E of FIG. 1. Similar to above, the write allocation module 304 determines, at stage B, that the extent 315 can be deduplicated. Additionally, as in stage E of FIG. 1, the write allocation module 304 determines that the hash generated at stage D is located in the hash-based extent map 308. The generated hash can be the same as, or different from, the hash generated at stage D of FIG. 1.

At stage F, the write allocation module 304 determines whether the extent 315 comprises data identical to that of an extent associated with the hash located in the hash-based extent map 308 identified at stage E ("existing extent"). The operations performed by the write allocation module 304 to determine whether the extent 315 is identical to the existing extent can be substantially similar to those described at stage E of FIG. 1. In this example, however, the write allocation module 304 determines that the extent 315 is different from the existing extent. In other words, the write allocation module 304 determines that a hash collision has occurred and determines that a non-hash-based extent identifier should be allocated.

At stage G, the write allocation module 304 allocates a non-hash-based extent identifier and one or more physical blocks to the extent 315. The non-hash-based extent identifier ("extent identifier") can be allocated by identifying an available extent identifier. For example, the write allocation module 304 might access file system metadata, such as a list of available extent identifiers. Once an available extent identifier is identified, the write allocation module 304 can indicate that the identified extent identifier has been allocated by updating the file system metadata.

To allocate the one or more physical blocks to the extent 315, the write allocation module 304 can perform operations substantially similar to those described at stage F of FIG. 2.

At stage H, the write allocation module 304 updates the non-hash-based extent map 310 to map the extent identifier allocated at stage G to the allocated physical blocks. The operations performed by the write allocation module 304 can be substantially similar to those described at stage G of FIG. 2. However, instead of updating the hash-based extent map 308 as described at stage G of FIG. 2, the write allocation module 304 updates the non-hash-based extent map 310. Entries in the non-hash-based extent map 310 can include additional metadata beyond the extent identifier and physical block number corresponding to the first of the one or more physical blocks allocated at stage G.

At stage I, the write allocation module 304 performs operations to "commit" the status of the file system. Similar to stage H of FIG. 2, stage I comprises multiple sub-stages (stages I1 through I4). The operations performed by the write allocation module 304 at stage I can be substantially similar to those described above at stage H of FIG. 2.

As described above, some extents are not available for inline deduplication. For example, a particular extent might be associated with a region that is not configured for deduplication. In such instances, a write allocation module would allocate a non-hash-based extent identifier to the extent. The technique for allocating the non-hash-based extent identifier to an extent that is not available for inline deduplication is substantially similar to the operations described at stages G and H of FIG. 3.

If a storage system implements the functionality described above, extents that can be inline deduplicated are identified by a hash-based identifier while extents that cannot be inline deduplicated are identified by a non-hash-based identifier. Even if an extent cannot be inline deduplicated, however, the extent may be deduplicated using other techniques. If deduplicated using a different technique, the extent may still be associated with a hash; however, the hash does not generally serve as the extent identifier, unlike a hash generated during inline deduplication.

Figure 4:
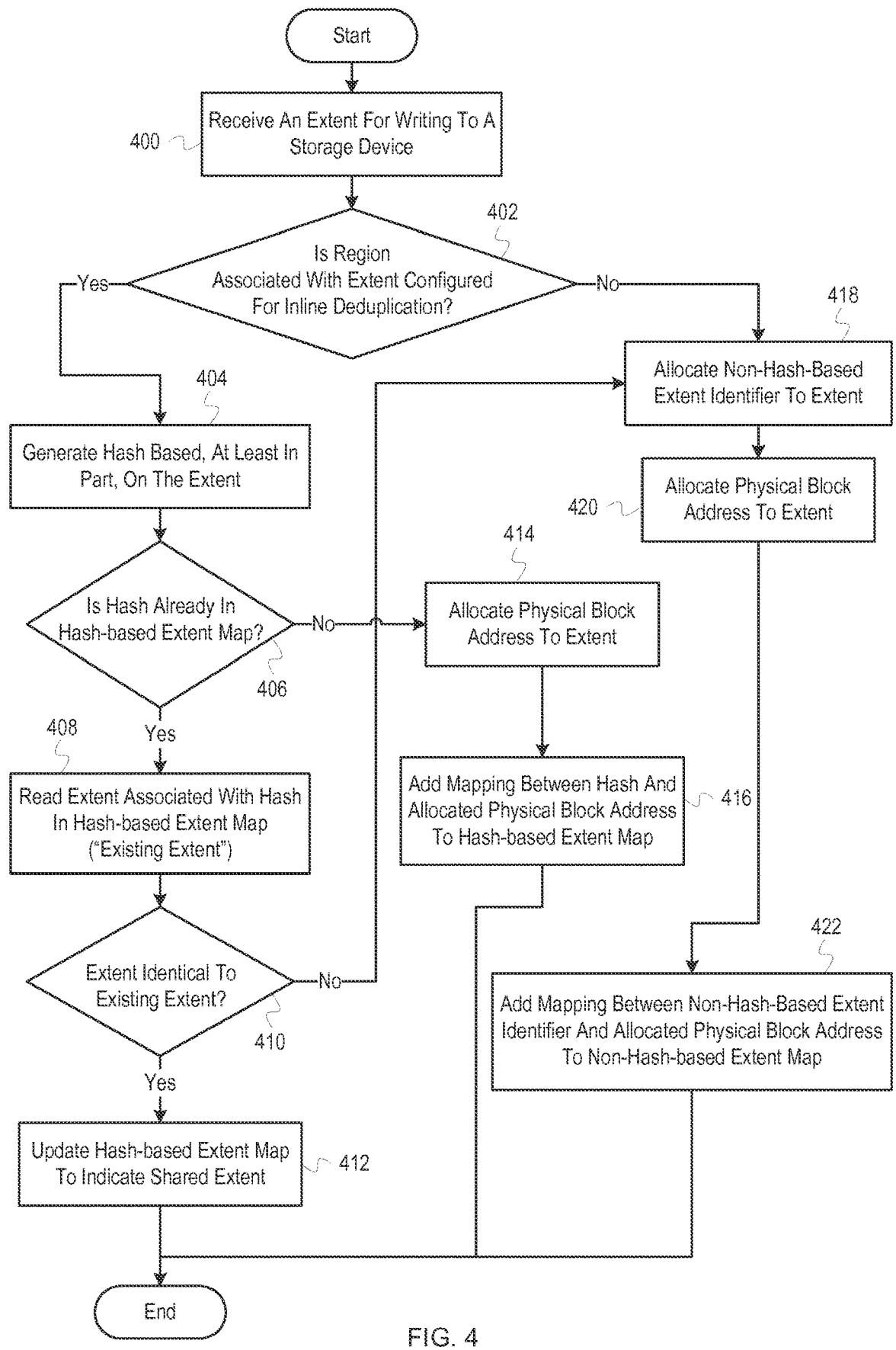
FIG. 4 depicts a flowchart of example operations for determining an extent identifier from multiple identifier spaces.

FIG. 4 depicts a flowchart of example operations for determining an extent identifier from multiple identifier spaces. The operations depicted in FIG. 4 can be performed by a write allocation module, such as the write allocation module 104 of FIG. 1, or any suitable component.

At block 400, a write allocation module receives an extent for writing to a storage device. The extent can be received from a component within a storage controller comprising the write allocation module, from a component external to the storage controller (e.g., a client), etc. The extent may be associated with metadata, such as a volume identifier, file identifier, file offset, etc. After the write allocation module receives the extent for writing to the storage device, control flows to block 402.

At block 402, the write allocation module determines whether the extent is associated with a region that is configured for inline deduplication. To determine whether the region associated with the extent is configured for inline deduplication, the write allocation module accesses metadata corresponding to the extent. The write allocation module can determine based, at least in part, on the metadata, a volume associated with the extent, what type of storage device the extent will be written to, whether the extent is associated with file system metadata or user data, etc. The determined characteristic corresponds to the region associated with the extent (e.g., an associated volume can be a region, the type of storage device can be a region, etc.). The write allocation module can then access metadata associated with the region itself to determine whether the region is configured for inline deduplication. If the region associated with the extent is configured for inline deduplication, control flows to block 404. If the region associated with the extent is not configured for inline deduplication, control flows to block 418.

At block 404, the write allocation module generates a hash based, at least in part, on the extent. The hash can be generated by performing one or more operations on the extent. For example, the write allocation module might use an algorithm such as SHA-1 or MD5 to generate the hash. In some instances, the write allocation module may delegate the hash generation to a specialized or separate component, as depicted in FIGS. 1 through 3. After the write allocation module generates the hash, control flows to block 406.

At block 406, the write allocation module determines whether the hash is already contained in an entry in a hash-based extent map. The write allocation module can scan the hash-based extent map or utilize another search technique to determine whether the hash-based extent map already contains an entry with the hash. If the write allocation module determines that the hash-based extent map already contains an entry with the hash, control flows to block 408. If the write allocation module determines that the hash-based extent map does not contain an entry with the hash, control flows to block 414.

At block 408, the write allocation module reads an extent associated with the hash in the hash-based extent map ("existing extent"). The hash-based extent map maps an extent identifier (the extent hash) to a physical block identifier. Thus, the write allocation module identifies the physical block identifier currently mapped to the hash and reads the associated extent, which is stored on the storage device at the location identified by the physical block identifier. After the write allocation module reads the existing extent, control flows to block 410.

At block 410, the write allocation module determines whether the extent received at block 400 is identical to the existing extent. To determine whether the extents are identical, the write allocation module can perform a bitwise comparison or other operations. If the write allocation module determines that the extents are identical, control flows to block 412. If the write allocation module determines that the extents are not identical, control flows to block 418.

At block 412, the write allocation module updates the hash-based extent map to indicate a shared extent. In other words, because the extents were determined to be identical, the received extent can be deduplicated (e.g., shared with the existing extent). To update the hash-based extent map, the write allocation module can increment a reference count associated with the shared extent. After the write allocation module updates the hash-based extent map to indicate the shared extent, the process ends.

Control flowed to block 414 if the write allocation module determined, at block 406, that the generated hash was not already in the hash-based extent map. At block 414, the write allocation module allocates a physical block identifier to the extent. To allocate the physical block identifier, the write allocation module can identify an available physical block identifier by accessing file system metadata, such as a "free" list. In particular, the write allocation module determines the number of blocks in the extent. The write allocation module then identifies a set of available contiguous physical blocks that comprises at least the same number of physical blocks as the extent. The write allocation module then identifies the physical block identifier associated with the first block of the identified contiguous physical blocks. The identified physical block identifier is allocated to the extent by removing the physical block identifier (and any physical block identifiers associated with the set of contiguous physical blocks) from the list of available physical blocks or otherwise indicating that the physical blocks have been allocated. After the write allocation module allocates the physical block identifier to the extent, control flows to block 416.

At block 416, the write allocation module adds a mapping between the hash and the allocated physical block identifier to the hash-based extent map. The particular operations performed to add the mapping to the hash-based extent map can vary depending on the configuration of the hash-based extent map. Generally, however, the write allocation module adds an entry comprising the hash and the physical block identifier to the hash-based extent map. The added entry can include additional metadata such as the size of the extent, a file identifier, etc. After the write allocation module adds the mapping between the hash and the physical block identifier to the hash-based extent map, the process ends.

Control flowed to block 418 if the write allocation module determined, at block 402, that the region associated with the extent is not configured for inline deduplication. Control also flowed to block 418 if the write allocation module determined, at block 410, that the extent was not identical to the existing extent. At block 418, the write allocation module allocates a non-hash-based extent identifier to the extent. The non-hash-based extent identifier can be a logical identifier or other type of identifier employed by the file system. The non-hash-based extent identifier can be allocated by accessing file system metadata, similar to allocating a physical block identifier. Additionally, the non-hash-based extent identifier can be allocated using other mechanisms as well. For example, the non-hash-based extent identifier can be an aggregate of multiple values, such as a volume identifier, file identifier, and unique number. After the write allocation module allocates the non-hash-based extent identifier to the extent, control flows to block 420.

At block 420, the write allocation module allocates a physical block identifier to the extent. The operations performed at block 420 can be substantially similar to those performed at block 414. After the write allocation module allocates a physical block identifier to the extent, control flows to block 422.

At block 422, the write allocation module adds a mapping between the non-hash-based extent identifier and the allocated physical block identifier to the non-hash-based extent map. The operations performed at block 422 can be substantially similar to those performed at block 416, except the mapping is added to the non-hash-based extent map instead of the hash-based extent map. After the write allocation module adds the mapping between the non-hash-based extent identifier and the allocated physical block identifier, the process ends.

The examples described above refer to extents as being associated with a particular region. In some storage systems, extents can be associated with multiple regions. If an extent is associated with multiple regions, the write allocation module (or similar component) can determine whether each region is configured for deduplication. If all associated regions are configured for deduplication, inline deduplication of the extent is allowed. If one or more of the associated regions are not configured for deduplication, inline deduplication of the extent is not allowed.

When a storage controller receives a read request (e.g., from a client), the read request identifies data to read. For example, in a block-level storage system, a read request might include a block identifier; in a file-level storage system, a read request might include a file identifier and a file offset. The identifier specified in the read request is typically a logical identifier. Thus, the storage controller determines a physical identifier corresponding to the specified logical identifier.

When a storage controller implements multiple identifier spaces, the storage controller identifies the particular identifier space that comprises the logical identifier specified by the read request (or related identifier, in the case of a file-level storage system). The storage controller can implement various mechanisms for identifying the identifier space. For example, the logical identifier itself can include a bit or set of bits that identify the identifier space. As another example, the storage controller can look up metadata associated with the logical identifier that specifies the identifier space. Once the particular identifier space is determined, the storage controller can look up the corresponding physical identifier in the identifier space and send a read request that includes the corresponding physical identifier to a storage device.

Figure 5:
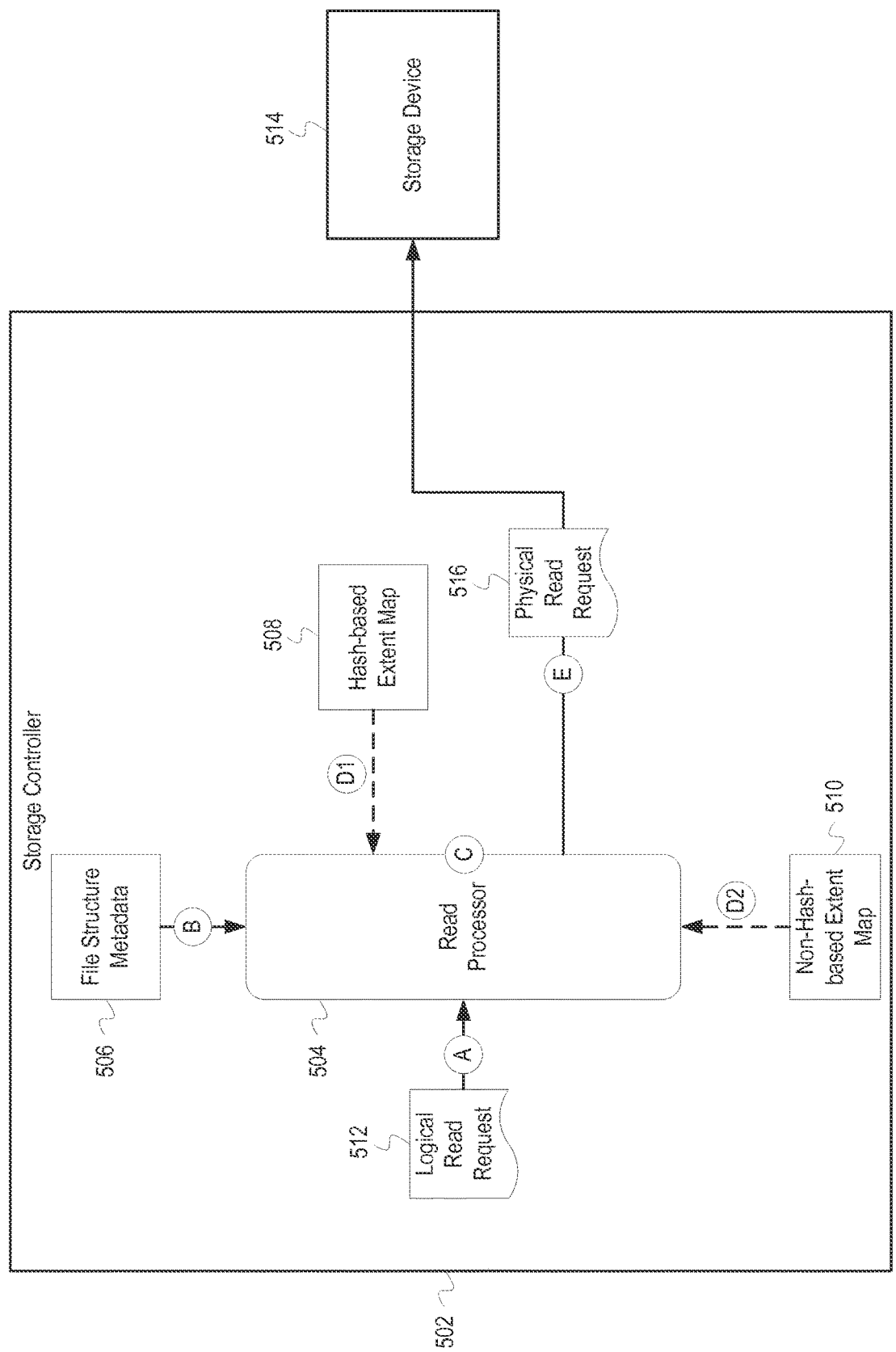
FIG. 5 depicts the processing of a read request by an example storage system with multiple identifier spaces.

FIG. 5 depicts the processing of a read request by an example storage system with multiple identifier spaces. FIG. 5 depicts a storage system 500 including a storage controller 502 and a storage device 514. The storage controller 502 includes a read processor 504. The storage controller 502 also includes file structure metadata 506, a hash-based extent map 508, and a non-hash-based extent map 510. The hash-based extent map 508 and the non-hash-based extent map 510 comprise file system metadata and may be resident in memory on the storage controller 502. Additionally, a copy of the hash-based extent map 508 and the non-hash-based extent map 510 is stored on the storage device 514. The storage device 514 can comprise one or more individual storage devices. For example, the storage device 514 can be a single hard drive, an array of drives, or a complex assortment of storage devices managed by a storage controller independent of the storage controller 502. In this example, the storage controller 502 implements a file-level file system and stores data associated with the files as extents.

At stage A, the read processor 504 receives a read request 512. The read request 512 comprises a file identifier and offset. The read request 512 can include other metadata as well, such as a volume identifier, client identifier, etc.

At stage B, the read processor 504 reads metadata from the file structure metadata 506. The file structure metadata 506 includes metadata about files that comprise the file system. For example, the read processor 504 may use the file identifier to identify a tree structure that represents the file associated with the file identifier. The read processor 504 can then use the file offset to traverse the tree structure (which can include inodes, indirect blocks, direct blocks, etc.) to identify an extent identifier (or multiple extent identifiers) corresponding to the file offset.

At stage C, the read processor 504 determines whether the extent identifier determined at stage B is hash-based or non-hash-based. As mentioned above, the particular technique used to determine which identifier space a particular extent identifier is part of can vary. For example, the extent identifier itself can include metadata embedded in the extent identifier. For example, the first bit of the extent identifier might be used to indicate whether the extent identifier is hash-based or not (e.g., if the first bit is '0' then the extent identifier is hash-based; if the first bit is '1' then the extent identifier is non-hash-based). As another example, the metadata read from the file structure metadata 506 might specify whether the extent identifier is hash-based or not (e.g., by including a specific bit or flag).

Once the read processor 504 determines whether the extent identifier is hash-based or not, the read processor 504 looks up the extent identifier in the corresponding extent map. In particular, if the read processor 504 determines that the extent identifier is hash-based, the read processor 504 performs the operations at stage D1; if the read processor 504 determines that the extent identifier is non-hash-based, the read processor 504 performs the operations at stage D2.

The operations at stages D1 and D2 can be substantially similar to each other. In particular, if the read processor 504 determines that the extent identifier is hash-based, the read processor 504 searches the hash-based extent map 508 for an entry that includes the hash-based extent identifier. If the read processor 504 determines that the extent identifier is non-hash-based, the read processor 504 searches the non-hash-based extent map 510 for an entry that includes the non-hash-based extent identifier. Once the entry is found, the read processor 504 reads the entry and any corresponding data. The entry comprises the extent identifier and a physical block identifier. The entry can also include a count of contiguous physical blocks that correspond to the extent.

At stage E, the read processor 504 sends a read request 516 to the storage device 514. The read request 516 comprises one or more physical block identifiers determined at stage D1 or D2.

In some instances, the read request 516 can be satisfied by a cache (not depicted) internal to the storage controller 502 or between the storage controller 502 and the storage device 514. Generally, the storage controller 502 receives a response to the read request 516 comprising the data identified by the physical block identifiers and then sends the data back to the source of the original read request 512.

The operations depicted in FIG. 5 can be adapted to non-file-level file systems, such as block-based or extent-based file systems. For example, if the storage controller 502 implements a block-based file system, the read request 512 can comprise a logical block identifier and the read processor 504 can look up metadata associated with the logical block identifier instead of file structure metadata.

Figure 6:
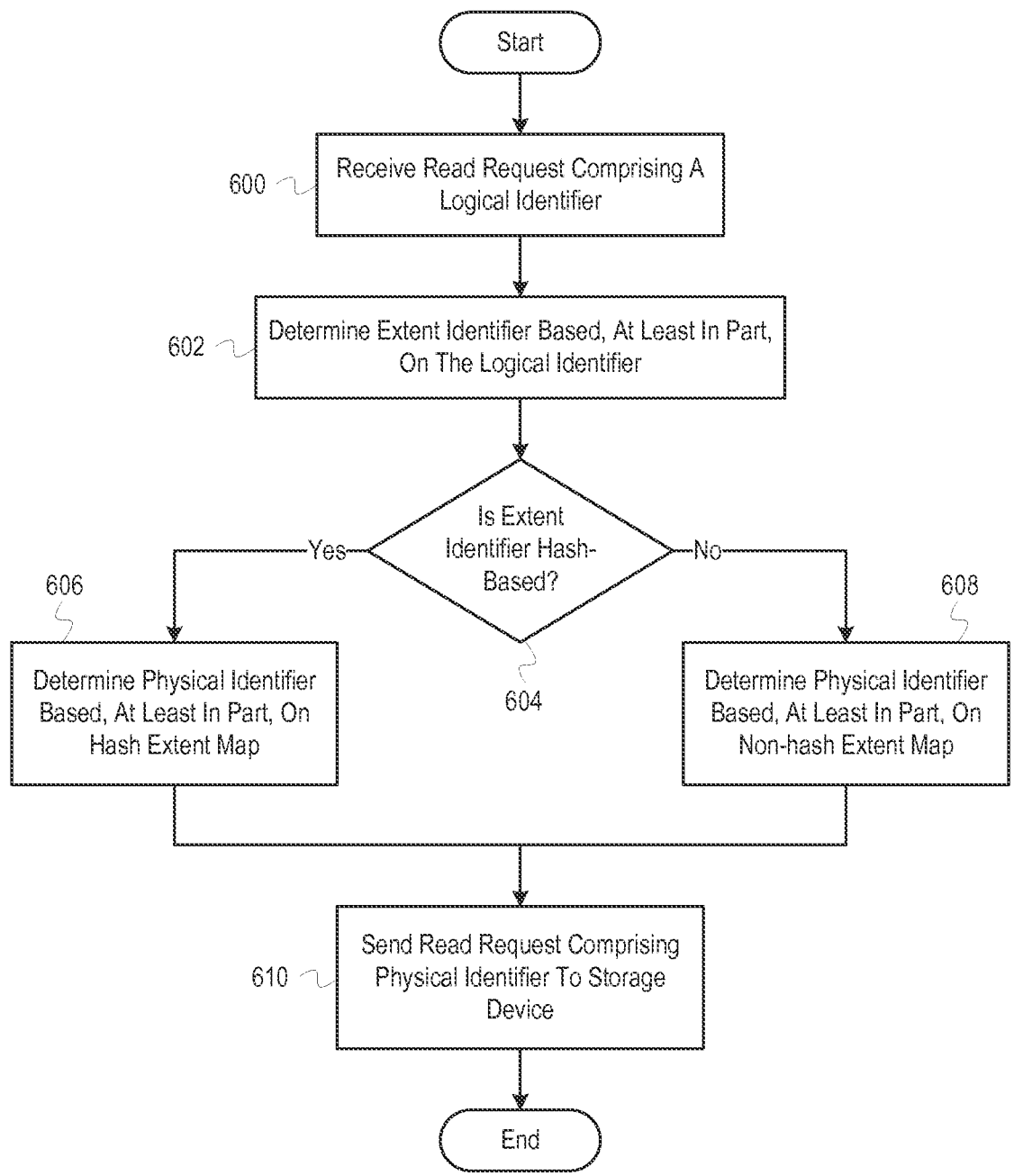
FIG. 6 depicts a flowchart of example operations for processing a read request.

FIG. 6 depicts a flowchart of example operations for processing a read request. The operations of FIG. 6 can be performed by a read processor, such as the read processor 504 of FIG. 5, or any suitable component.

At block 600, a read processor receives a read request that comprises a logical identifier. The logical identifier can vary depending on the file system implemented by a storage controller comprising the read processor. For example, the logical identifier can be a file identifier and offset, a logical block identifier, etc. In some instances, multiple file systems may be implemented. After the read processor receives the read request, control flows to block 602.

At block 602, the read processor determines an extent identifier based, at least in part, on the logical identifier. The particular technique used to determine the extent identifier can vary depending on the type of file system implemented by the storage controller. Generally, the read processor identifies metadata associated with the logical identifier. For example, the read processor may traverse a file system buffer tree to find a node of the tree that corresponds to the logical identifier. The node of the tree can store the metadata (or a reference to the metadata), which specifies the extent identifier and other attributes. After the read processor determines the extent identifier, control flows to block 604.

At block 604, the read processor determines whether the extent identifier is hash-based or not. As described above, the particular technique used to determine whether the extent identifier is hash-based or not can vary. For example, the read processor might determine whether the extent identifier is hash-based or not based on a particular bit in the extent identifier, metadata associated with the extent identifier, etc. If the read processor determines that the extent identifier is hash-based, control flows to block 606. If the read processor determines that the extent identifier is not hash-based, control flows to block 608.

At block 606, the read processor determines a physical identifier based, at least in part, on a hash-based extent map. In particular, the read processor looks up an entry identified by the extent identifier determined at block 602. The entry identifies one or more physical identifiers associated with the extent identifier. After the read processor determines the physical identifier, control flows to block 610.

Control flowed to block 608 if the read processor determined, at block 604, that the extent identifier was not hash-based. At block 608, the read processor determines a physical identifier based, at least in part, on a non-hash-based extent map. In particular, the read processor looks up an entry identified by the extent identifier determined at block 602. The entry identifies one or more physical identifiers associated with the extent identifier. After the read processor determines the physical identifier, control flows to block 610.

Control flowed to block 610 from either block 606 or 608. At block 610, the read processor sends a read request comprising the physical identifier to a storage device. After the read processor sends the read request to the storage device, the process ends.

As described above, extent identifiers are an example of a particular type of logical identifier. Similarly, hash-based extent identifiers and non-hash-based extent identifiers are examples of two different identifier spaces. More generally, a particular logical identifier may be part of one or more identifier spaces of a plurality of identifier spaces. Thus, a storage system determines which of the identifier spaces comprises the particular logical identifier and determines a physical identifier accordingly.

Figure 7:
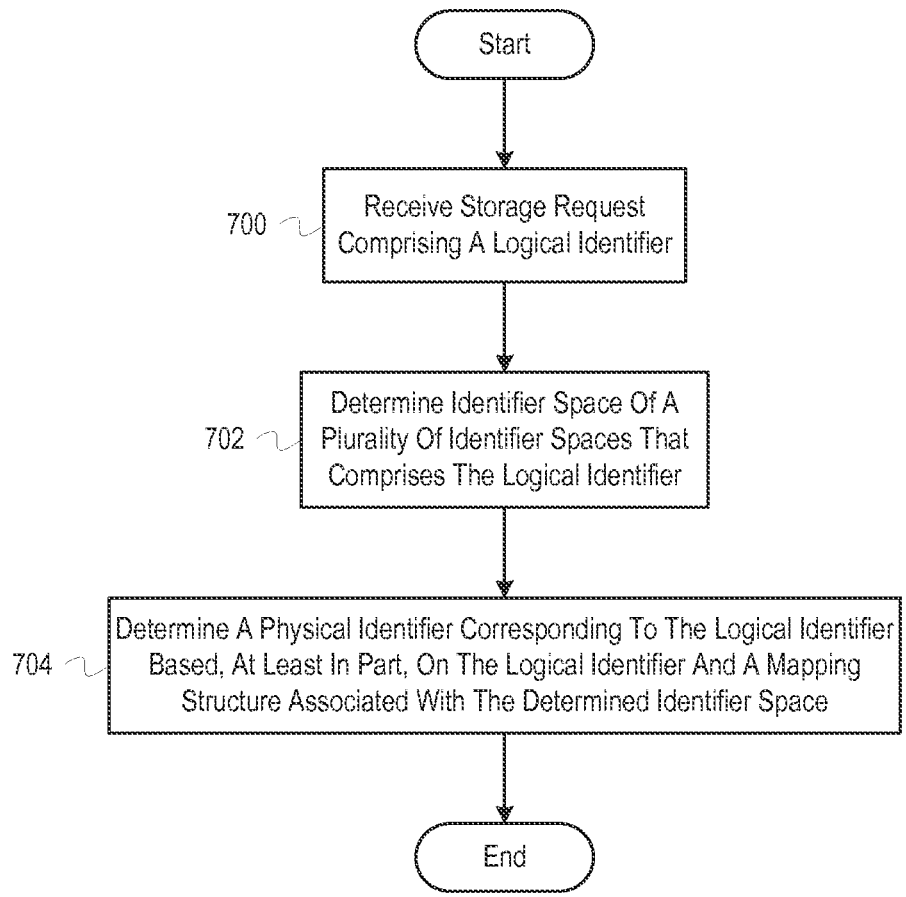
FIG. 7 depicts a flowchart of example operations for determining a physical identifier based, at least in part, on a logical identifier and a plurality of identifier spaces.

FIG. 7 depicts a flowchart of example operations for determining a physical identifier based, at least in part, on a logical identifier and a plurality of identifier spaces. The operations depicted in FIG. 7 can be performed by a write allocation module, such as the write allocation module 104 of FIG. 1, a read processor, such as the read processor 504 of FIG. 5, or any suitable component.

At block 700, a storage system component receives a storage request that comprises a logical identifier. The storage request can be a read request, a write request, or any other type of request implemented by a storage system. The logical identifier can be any type of logical identifier compatible with the storage system, such as a logical block identifier, a file identifier, an extent identifier, etc. After the storage system component receives the storage request, control flows to block 702.

At block 702, the storage system component determines an identifier space that comprises the logical identifier. The identifier space is one of a plurality of identifier spaces. The identifier space can be any type of identifier space. For example, the identifier space might be hash-based or non-hash-based. Each identifier space might represent some particular attribute. For example, in the examples above, the hash-based identifier space represented extents that were suitable for inline deduplication. The particular technique used to determine whether a logical identifier belongs to a particular identifier space can vary. For example, the storage system component might analyze metadata associated with the logical identifier and/or each of the identifier spaces. The storage system component might also analyze the logical identifier itself. For example, the logical identifier might have metadata embedded in it (e.g., particular bits represent metadata flags) or might have specific characteristics (e.g., be alphanumeric instead of numeric). After the storage system component determines the identifier space that comprises the logical identifier, control flows to block 704.

At block 704, the storage system component determines a physical identifier that corresponds to the logical identifier based, at least in part, on the logical identifier and a mapping structure associated with the determined identifier space. Although the mapping structure can vary, the mapping structure typically includes entries identifying (and possibly indexed by) the logical identifier. The storage system component thus searches the mapping structure for an entry that identifies the logical identifier. The entries also include the corresponding physical identifier (or multiple physical identifiers). Thus, the storage system component reads the physical identifier from the entry that identifies the logical identifier. The entries can also include other metadata, such as a number of physical blocks that correspond to the logical identifier. Thus, for example, the storage system component might identify a set of physical identifiers based on an initial physical identifier and a count of physical blocks included in the entry. In particular, if the physical identifier in the entry is 0x04A and the count is 5, the storage system component determines that physical identifiers 0x04A, 0x04B, 0x04C, 0x04D, and 0x04E identify physical blocks corresponding to the logical identifier. After the storage system component determines a physical identifier that corresponds to the logical identifier, the process ends.

FIGS. 1 through 3 and 5 are annotated with a series of letters (e.g., A through H). These letters represent stages of operations. Although these stages are ordered for the related examples, the stages illustrate particular examples to aid in understanding this disclosure and should not be used to limit the claims. Subject matter falling within the scope of the claims can vary with respect to the order and some of the operations.

Although the examples above describe non-hash-based extent identifiers and hash-based extent identifiers, identifier spaces can consist of any combination of any type of identifier as long as it can be determined which identifier space a particular identifier belongs to. Further, a hash-based extent identifier, as described above, refers to an extent identifier based on a hash of the extent itself. A non-hash-based extent identifier, as described above, refers to an identifier that is not based on a hash of the extent itself. However, a non-hash-based identifier may include a hash not based off of the extent. For example, instead of maintaining a list of available extent identifiers, a storage system may use a hash function to generate a unique value to use as an extent identifier. However, instead of generating the hash from the extent (which may be large), the storage system may generate the hash from a small amount of random data (e.g., a current timestamp).

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 606 and 608 can be performed in parallel or concurrently for different read requests. With respect to FIG. 7, the operations at block 700 might not be performed. For example, instead of receiving a logical identifier as part of a storage system request, the logical identifier might be received or used by an internal operation of the storage system/storage controller. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
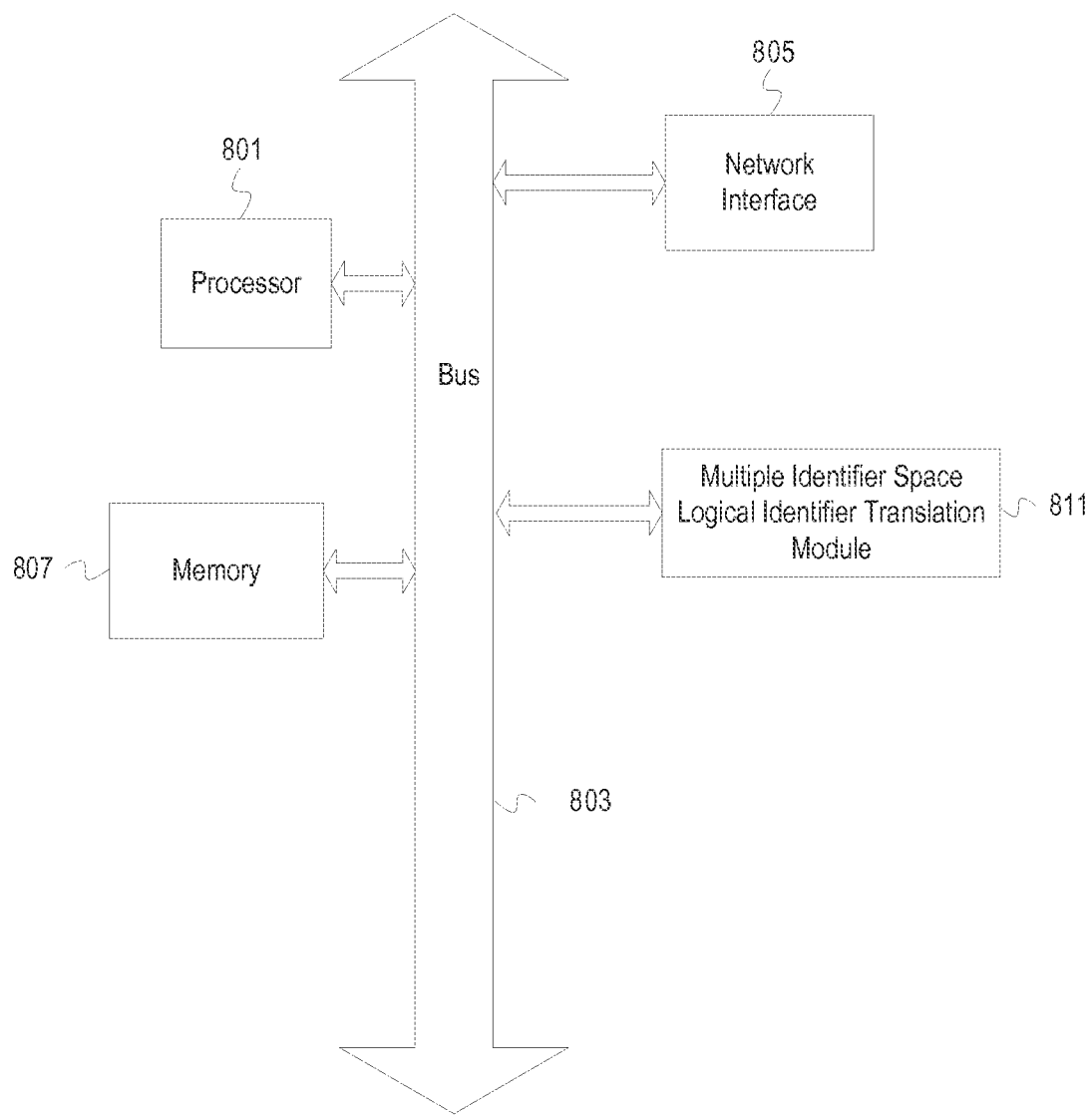
FIG. 8 depicts an example computer system with a multiple identifier space logical identifier translation module.

FIG. 8 depicts an example computer system with a multiple identifier space logical identifier translation module. The computer system includes a processor 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport® bus, InfiniBand® bus, NuBus, etc.) and a network interface 805 (e.g., a Fiber Channel interface, an Ethernet interface, an internet small computer system interface, SONET interface, wireless interface, etc.). The system also includes a multiple identifier space logical identifier translation module 811. The multiple identifier space logical identifier translation module 811 embodies functionalities described above. In particular, the multiple identifier space logical identifier translation module 811 embodies functionality to determine which of a plurality of identifier spaces a particular logical identifier belongs to and translate the logical identifier into a physical identifier. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for mapping identifiers in storage systems as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

The terms "logical identifier" and "physical identifier" or variations thereof are used herein. Originally, physical identifiers were identifiers that had direct correlations to particular locations on a physical medium. For example, a physical medium may be divided into blocks. The individual blocks are assigned a particular identifier (e.g., address). The identifiers assigned to the blocks on the physical medium are physical identifiers.

A logical identifier, on the other hand, may not have a direct correlation to a particular location on a physical medium. For example, assume that the blocks of a physical medium are assigned in a linear fashion (e.g., sequential physical identifiers denote sequential blocks on the physical medium). Logical identifiers may be mapped to the physical identifiers; however, sequential logical identifiers may not correspond to sequential physical identifiers. For example, logical identifier 0x001 might map to physical identifier 0x201 and logical identifier 0x002 might map to physical identifier 0x010.

However, storage systems have evolved greatly, and whether an identifier is a logical identifier or physical identifier is more of a matter of perspective. For example, a storage system may take disparate physical media and "export" a view of the physical media that, to a client, makes the physical media appear to be one single drive (e.g., a single continuous physical medium). Thus, from the client's perspective, communications sent to the storage system use physical identifiers. However, when the storage system receives communications from the client, the storage system maps the identifier received from the client to an actual physical identifier that corresponds to a physical location on the disparate physical media. Thus, from the storage system's perspective, the identifier used by the client is a logical identifier, not a physical identifier.

As used herein, the terms "logical identifier" and "physical identifier" are used to denote identifiers that may be mapped to each other. Thus, a physical identifier may not have a direct correlation to a physical location on a physical medium (i.e., a physical identifier may also be a logical identifier). Additionally, the fact that a particular identifier is a logical identifier does not foreclose the possibility that the logical identifier does map directly to a physical location on a physical medium (e.g., logical identifier 0x013 might be mapped to physical identifier 0x013 and physical identifier 0x013 might correspond to an actual physical location on a particular physical medium).

Both logical identifiers and physical identifiers can be used in conjunction with the file system and/or storage system hardware to locate data associated with the particular identifier.

A "region", as used herein, is a logical grouping of data units based on one or more properties. For example, data units that belong to the same volume may be considered to be part of the same region. As another example, all data units that are compressed may be considered to be part of the same region. Even if a particular storage system does not explicitly implement "regions", a logical grouping of data units within the particular storage system may still be a region.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
  generating, by a computing device, a hash from a first data unit;
  determining, by the computing device, when the first data unit is available for deduplication based on the generated hash of the first data unit matching another generated hash of another data unit;
  updating, by the computing device, a hash-based map to map the generated hash of the first data unit and the another data unit directly to a physical identifier for storage without any logical identifier when the determination indicates the deduplication; and
  updating, by the computing device, a non-hash based map to map a logical identifier of the first data unit to the physical identifier for storage without the generated hash when the determination indicates an absence of the deduplication.

2. The method of claim 1, further comprising accessing, by the computing device, the non-hash based map to service a read request when a determination identifies an absence of a hash based identifier in an extent associated with the read request.

3. The method of claim 1 further comprising:
  accessing, by the computing device, the hash-based map to service a read request when a determination identifies a hash based identifier in an extent associated with the read request.

4. A non-transitory machine readable medium having program code stored thereon, the program code comprising program code to:
  generate a hash from a first data unit;

determine when the first data unit is available for deduplication based on the generated hash of the first data unit matching another generated hash of another data unit;

update a hash-based map to map the generated hash of the first data unit and the another data unit directly to a physical identifier for storage without any logical identifier when the determination indicates the deduplication; and update a non-hash based map to map a logical identifier of the first data unit to the physical identifier for storage without the generated hash when the determination indicates an absence of the deduplication.

5. The non-transitory machine readable medium of claim 4 further comprising program code to:

access the non-hash based map to service a read request when a determination identifies an absence of a hash based identifier in an extent associated with the read request.

6. The non-transitory machine readable medium of claim 4 further comprising program code to access the hash-based map to service a read request when a determination identifies a hash based identifier in an extent associated with the read request.

7. A device comprising:

a processor; and a machine-readable medium having program code executable by the processor to cause the device to:

generate a hash from a first data unit;

determine when the first data unit is available for deduplication based on the generated hash of the first data unit matching another generated hash of another data unit; and update a hash-based map to map the generated hash of the first data unit and the another data unit directly to a physical identifier for storage without any logical identifier when the determination indicates the deduplication; and update a non-hash based map to map a logical identifier of the first data unit to the physical identifier for storage without the generated hash when the determination indicates an absence of the deduplication.

8. The device of claim 7, wherein the machine-readable medium further comprises program code executable by the processor to cause the device to access the non-hash based map to service a read request when a determination identifies an absence of a hash based identifier in an extent associated with the read request.

9. The device of claim 7, wherein the machine-readable medium further comprises program code executable by the processor to cause the device to access the hash-based map to service a read request when a determination identifies a hash based identifier in an extent associated with the read request.

* * * * *